Jan. 29, 1963

P. R. JUCKNIESS ETAL 3,075,263

APPARATUS FOR MELTING METALS

Filed May 21, 1958

INVENTORS.
Poul R. Juckniess
George B Cobel
Douglas S. Chisholm
BY C.W. Carlin
ATTORNEY INVENTORS.
Paul R. Juckniess
George B. Cobel
Douglas S. Chisholm
BY C.W. Carlin
ATTORNEY Jan. 29, 1963   P. R. JUCKNIESS ETAL   3,075,263
APPARATUS FOR MELTING METALS
Filed May 21, 1958
4 Sheets-Sheet 3

INVENTORS.
Paul R. Juckniess
George B. Cobel
Douglas S. Chisholm
BY C. W. Carlin
ATTORNEY Jan. 29, 1963  P. R. JUCKNIESS ETAL  3,075,263
APPARATUS FOR MELTING METALS
Filed May 21, 1958  4 Sheets-Sheet 4
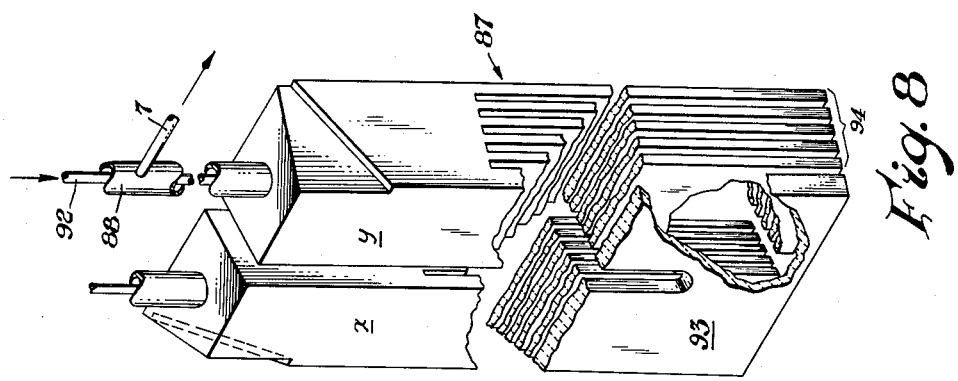
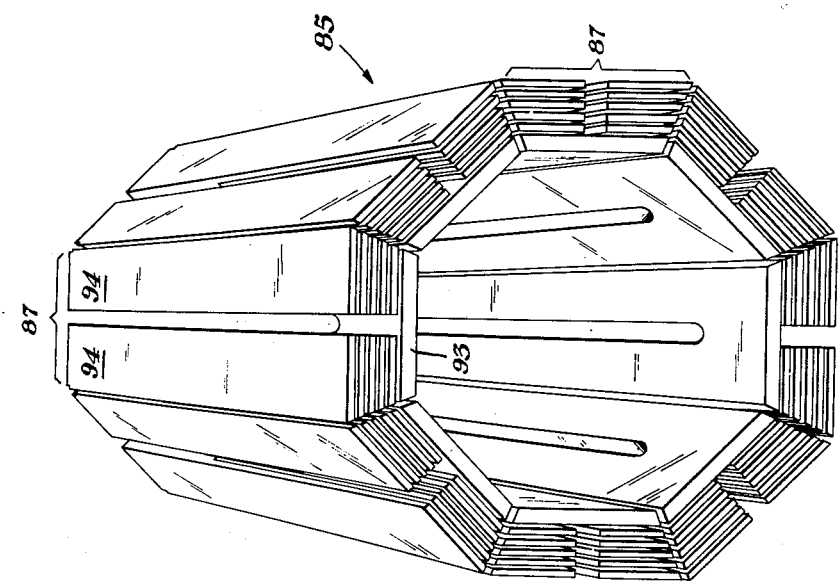
INVENTORS.
Paul R. Juckniess
George B Cobel
Douglas S. Chisholm
BY
C.W.Carlin
ATTORNEY

United States Patent Office 3,075,263
Patented Jan. 29, 1963

3,075,263
APPARATUS FOR MELTING METALS
Paul R. Juckniess, George B. Cobel, and Douglas S. Chisholm, Midland, Mich., assignors to The Dow Chemical Company, Midland, Mich., a corporation of Delaware
Filed May 21, 1958, Ser. No. 736,806
1 Claim. (Cl. 22—57.2)

The invention relates generally to the melting of materials having a melting point below about 3300° C. and especially to the melting of metals having a melting point below about 2600° C. It more especially relates to an apparatus for melting metals which require a protective inert atmosphere when in the molten state and to the subsequent solidification thereof either as substantially pure metal ingots or as ingots comprising such metals alloyed in desired proportions with other metals. It more particularly relates to the melting of subgroup IVa metals, viz., hafnium, thorium, titanium, and zirconium, and to the rare earth metals, viz., the metals of atomic number 57 to 71 inclusive, i.e., lanthanum to lutecium, of the periodic table of elements.

The winning of these metals from their ores and their subsequent purification, alloying, and fabrication present particularly difficult problems due to their high degree of activity at the advanced temperatures necessarily employed in the metallurgy of these metals. They cannot be satisfactorily melted in conventional type apparatus which is satisfactory for most other metals because the heated subgroup IVa and rare earth metals must be protected from contaminating gases including air and because they react with the materials of which melting pots and crucibles are commonly made, the metal which is being melted thereby becoming contaminated. Small amounts of substances commonly present during the heating of metals, unless positive steps are taken to exclude them, e.g., carbon, nitrogen, and oxygen, are very harmful to subgroup IVa and rare earth metals.

Subgroup IVa metals are commonly produced on a commercial scale by reducing a graded ore consisting largely of the oxide, as by heating with carbon thereafter chlorinating to produce the tetrachloride, and subsequently producing the subgroup IVa metal by reducing the chloride by reacting it with a metal more electropositive than the subgroup IVa metal, magnesium metal usually being so employed. The subgroup IVa metal thus produced is an irregularly shaped mass or odd shaped pieces of sponge intermixed with some reducing metal and its chloride. The metal sponge is thereafter subjected to water and acid leaching or to a vacuum distillation process to remove a substantial portion of the adhering or entrained reducing metal and its chloride. Even after vacuum distillation or leaching, the sponge usually retains some contaminants and sometimes acquires other contaminants, particularly nitrides or oxides, by contact with the air thus imparting brittleness to the metal and largely destroying the special properties of the metal which characterize it and upon which its utility is largely dependent. Furthermore, for purposes of rolling, shaping, or alloying the aforesaid metal sponge, it is almost invariably required that the metal sponge be cast into massive metal ingots, billets or rods prior to a rolling or alloying process.

The production of rare earth metals beyond experimental amounts is not yet well developed and is unsatisfactory to meet present needs. The production of cerium will serve to illustrate a present method. Cerium is now generally produced by converting the ores to cerium fluoride or chloride and thereafter either electrolyzing the fluoride or chloride in a molten alkali metal halide salt bath or reducing the fluoride or chloride by a reducing metal, e.g., calcium, strontium, or barium either in a bomb or an open crucible.

The yield by electrolysis, when oxygen is excluded, as by providing an inert atmosphere, is not over about 90 percent cerium. The low yield is thought to be due to a failure of the finely dispersed metal to coagulate and to an appreciable concentration of cerium salt in equilibrium with the alkali halide bath. When oxygen is not excluded, the yield is usually not over about 80 percent due to further loss by oxidation, generally thought to result in the formation of oxyhalides.

The yield, when cerium halide is reduced by calcium, is much higher than by electrolysis, but the reaction is highly exothermic and the heat generated must be kept within safe limits as, for example, by adding an inert material to the bath or by adding the calcium gradually in a slowly reactive state, e.g., in the form of a few large pieces. Such precautions slow down the reaction to an undesirable extent.

Scrap metal containing appreciable amounts of subgroup IVa and/or rare earth metals is a potential source of such metals for preparing alloys for further fabrication. Present methods of salvaging such metals require that not only they be more or less particulated and melted under protective conditions, but also that the salvaged metal be subsequently compacted into shapes suitable for use as consumable electrodes and the electrodes thus made be thereafter arc-melted in an electric-arc furnace, the protective conditions against contamination being maintained throughout the process. Arc-melting is not currently economically feasible for salvaging subgroup IVa or rare earth metals from scrap metal containing alloys thereof.

Arc-melting is commonly employed, however, in making new alloys containing subgroup IVa or rare earth metals. In arc-melting, an arc is struck in a substantially evacuated or inert gas-filled chamber usually between a consumable electrode or a high-melting electrode, e.g., tungsten, and a copper crucible containing a heel or stub of the metal to be produced which serves as a second electrode. When a consumable electrode is employed it comprises, in addition to the subgroup IVa or rare metal to be produced, alloying metals in the percentages desired. When a tungsten electrode is employed, the subgroup IVa or rare earth metal, including alloying metals, is supplied in convenient-sized pieces to the copper crucible from a continuous controllable feed source as by a hopper and shaker arrangement.

A number of disadvantages are attendant upon the arc-melting method of alloying subgroup IVa and/or rare earth metals with other metals. Prominent among such disadvantages is the lack of homogeneity of the alloy produced. When the metals are thus not uniformly alloyed there results areas of weakness and unequalized stresses within the alloy. The lack of homogeneity is partially overcome by remelting the imperfect alloy in an arc but this incurs considerable additional expense. D.C.

is required for effective arc-melting since the receptacle, e.g., the copper crucible, must be the cathode; the cost of D.C. is considerably higher than A.C.

When a consumable electrode is employed, the sponge metal must be compacted into rods which are usually then welded end-to-end to form a continuous electrode. Such compacting and welding are costly steps. When a tungsten electrode is employed the initial cost is high. Furthermore, during the arc-melting process, small pieces of the tungsten fall into the ingot and remain therein as discrete bits of tungsten in the alloy. Such bits cause weak spots that are particularly objectionable in the preparation of sheets of subgroup IVa metal because a hole usually results at the locus of the bit of tungsten. A further objection to the bits of tungsten is the damage to rolls which occurs during a subsequent rolling and shaping process due to excessive hardness of the tungsten. Using a tungsten electrode also results in some uncontrolled alloying of tungsten with the metal being produced.

Alloys which consist principally of metals other than the subgroup IVa and rare earth metals have been found to be considerably improved by their being melted in an atmosphere of an inert gas. Among such alloys are certain of the stainless steels. Accordingly, the apparatus and the process of the invention are adapted to the production of such alloys as well as to those of subgroup IVa and rare earth metals.

There is, therefore, a desideratum in the art for an improved means for melting materials particularly for melting metals requiring an inert gas atmosphere such as those metals containing subgroup IVa and rare earth metals, making ingots containing such metals, and for salvaging metals particularly subgroup IVa and rare earth metals from scrap metal.

The invention is an apparatus of novel design and construction for melting materials having a melting point below about 3300° C. for use in a process which comprises feeding the material in a particulate state onto a vertically retractable plate horizontally positioned in upwardly and downwardly extending vertical walls, melting the material on the plate by radiant heat to form a molten mass, retracting the plate as the molten mass increases, continually cooling the lower portion of said mass to form a continuous ingot, supplying additional material onto the top surface of the ingot and removing the ingot thus formed. The material to be melted may be of any size pieces which can be accommodated by the feed means of the apparatus, but it is preferable that it be in a particulate or fragmented state. The apparatus may employ heating elements of tungsten, tantalum, molybdenum or various high melting oxides arranged to describe a heating chamber having an opening in the bottom thereof which chamber emits radiant heat downwardly through said opening in accordance with the black body effect. The preferred form and materials of the invention employ graphite heating elements about which are positioned molybdenum baffles which are subjected substantially to the same temperature as the material being melted. The preferred embodiment of the invention is therefore directed toward melting materials having a melting point below that of molybdenum, i.e., below about 2600° C.

FIGURE 7 is a perspective view, looking generally upward, of the assembled radiant heater only of FIGURES 2 and 3 consisting of eight substantially vertical graphite electrical resistors and, exterior thereto and forming an integral part of each resistor, five graphite baffles.

FIGURE 8 is an isometric view with parts broken away of one of the eight heating elements and the exterior graphite baffles integral therewith shown assembled in FIGURES 3 and 7.

Figure 1:
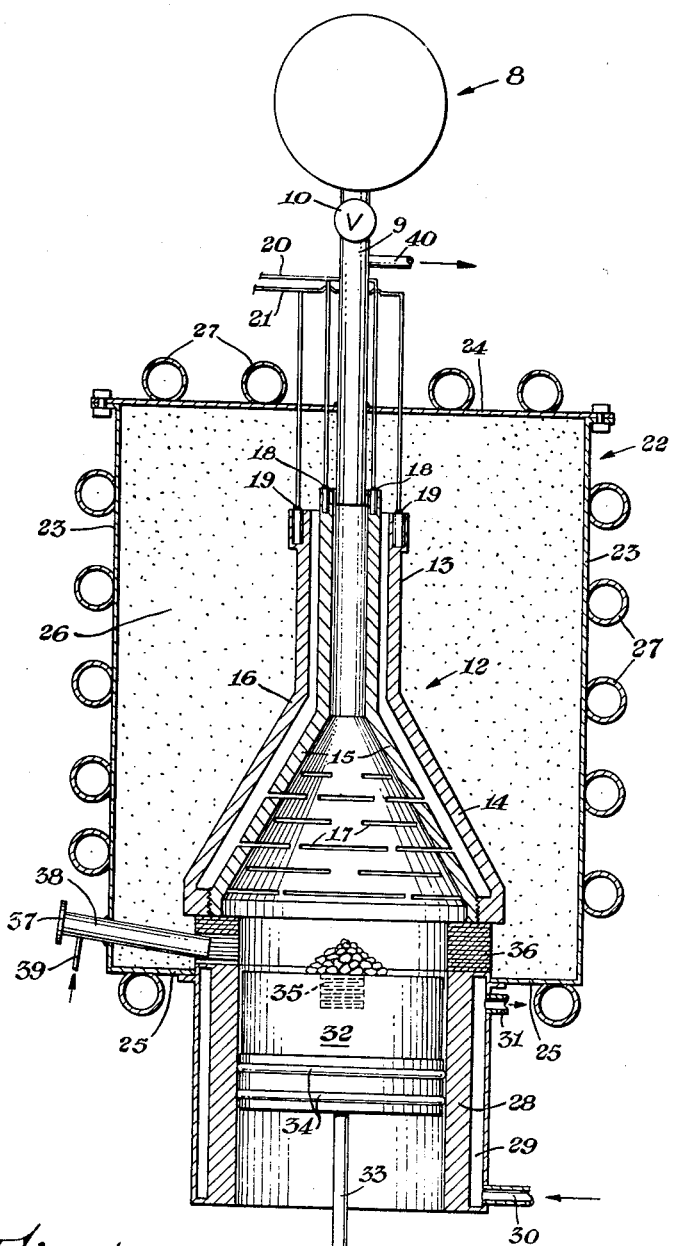
FIGURE 1 is an elevation, largely in section, of one embodiment of the apparatus of the invention.

Referring to the drawing in more detail and particularly to FIGURE 1, there is shown feed reservoir 8 for particulate or fragmented metal to be melted and vertical feed tube 9, containing control valve 10, leading therefrom. Directly below and in alignment with feed tube 9 is a graphite radiant heater indicated generally by numeral 12. Radiant heater 12 consists of cylindrical neck 13 which flares out to form cone-shaped base 14. Both neck 13 and base 14 consist of inner member 15 and outer member 16 substantially concentric therewith. Inner member 15 of base 14 contains horizontally elongated slots substantially equally spaced apart in rows. Radiant heater 12 is open at the top to admit feed tube 9 and at the bottom to provide free passageway of particulate metal therethrough. Electrical terminals 18 and 19 on inner and outer members 15 and 16, respectively, make connections with electric lead-in lines 20 and 21, respectively. Positioned about radiant heater 12 is insulation chamber 22 which comprises cylindrical outer wall 23, top 24, and bottom 25; it incloses radiant heater 12, except for top and bottom openings which correspond with the top and bottom openings in radiant heater 12. Granular carbon body 26 fills the space defined by chamber 22 and radiant heater 12. About insulation chamber 22 in contact with 23, 24, and 25 at more or less equally spaced intervals as shown is coil 27 through which cooling water is circulated. Cylindrical copper mold 28 is positioned below radiant heater 12 in substantial vertical alignment therewith and is of somewhat smaller diameter than the heater. Water jacket 29 is adjacent to and exterior of mold 28 and is provided with water inlet 30 and outlet 31. Retractable cylindrical hearth 32 is slidably positioned in mold 28 and supported therein by rod 33. O-rings 34 provide sealing engagement between hearth 32 and the inner wall of mold 28. Recess 35 is more or less centrally located in the upper face of hearth 32. Flat metal annular shims 36 are placed horizontally between radiant heater 12 and mold 28. Sight glass 37 and sight tube 38 provide means for observing hearth 32. Inert gas inlet 39 is located in sight tube 37. Inert gas outlet 40 is located in feed tube 9.

The apparatus illustrated by FIGURES 2 to 8 is an embodiment of the invention employing certain modifications of the apparatus of FIGURE 1. There are shown an insulating chamber, indicated generally by numeral 50, having a cylindrical side wall 51, sloping bottom 52, top flange 53, and cover 54 thereon. O-ring 55 provides a tight seal between flange 53 and cover 54. Cooling coil 56 encircles side wall 51. Annular cooling coil 57 is secured to cover 54. Sight tube 58 passing through cover 54 provides a means for looking downwardly into the apparatus. Inlet duct 59 affixed to wall 51 at an opening provided therefore is attached to a source of pressurized inert gas (not shown). Duct 60, having flanged collar 61 and frangible safety disk 62 thereon which is held in place by annular ring 62a and bolts 62b, leads from an opening provided therefor in sidewall 51. Neck 63 at an opening provided therefor in wall 51, having flanged collar 64 and cover 65 thereon held in place by bolts 66, provides access to the interior of the apparatus for purposes of inspection and maintenance and to provide a means for attaching the feed mechanism, described in the following paragraph.

Metal in the form of pieces or particles which is to be melted is supplied by reservoir 70 to feed chute 71 which passes through an opening provided therefor in neck cover 65 which opens into feed box 72 comprising two fixed vertical sides, of which side 73 is shown, vibratable platform 74 resting on support 74a, and over-hanging shield 75. Platform 74 is vibrated by reciprocating shaft 76 which operates through stuffing box 77 and is attached to a crank and gearing assembly which is inside of housing 78 and is operated by motor 79.

Hearth 80 containing tapered mortise 81 is vertically positioned in mold 82 to receive particulate or fragmented metal from platform 74. Hearth 80 and mold 82 are described more fully hereinafter.

Figure 3:
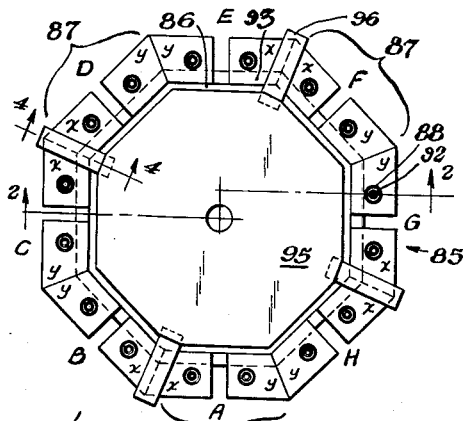
FIGURE 3 is a plan view of the assembled radiant heater of the apparatus of FIGURE 2 shown along line 3—3 of FIGURE 2.

Heat for melting the metal is provided by octagon-shaped radiant heater 85 (a plan view of which is shown in FIGURE 3 and a perspective view of which is shown in FIGURE 7). 85 is made up of eight graphite heating elements 87. FIGURE 8 shows a single heating element 87 in some detail. Each element 87 consists of a resistor 93 and exterior thereto five integrally formed baffles 94 substantially parallel to resistor 93. Baffles 94 are completely cut through to their lower edge, whereas resistors 93 are not cut through, thus providing a path for a continuous flow of electrical current through each resistor 93 but preventing such flow through baffles 94. The electrical circuits in relation to resistors 93 are shown schematically in FIGURES 5 and 6.

Heating elements 87 are suspended from cover 54 by means of water cooled nipples 88 which are tightly inserted and extend vertically downward for a distance into each element 87. Two nipples extend into each element as shown in FIGURE 8. The nipples are supported by cover 54 by means of female insulating bushings 89 into which male bushings 90 are threadedly engaged. Bushings 89 in turn are threadedly engaged in holes provided therefor in flat annular plate 91 which is secured to cover 54 by means of bolts 91a. Bushings 89 taper inwardly as they extend downwardly into plate 91. Bushings 90 are slotted vertically near their lower ends so that when they are screwed into bushings 89, male bushings 90 grip water-cooled nipples 88 and thereby through female bushings 89 support them in plate 91. Copper tubes 92, inserted firmly in nipples 88 are connected to a source of cooling water (not shown). The hollow portions of tubes 92 and nipples 88 serve as channels for circulating water, the water entering tubes 92, passing downwardly therethrough and out the lower open ends thereof into the annular channel between 92 and nipples 88, and thence passing up the annular channel and out return line 7. Nipples 88 also serve as electrical terminals for resistors 93 as explained more fully hereinafter in relation to FIGURES 5 and 6.

Figure 4:
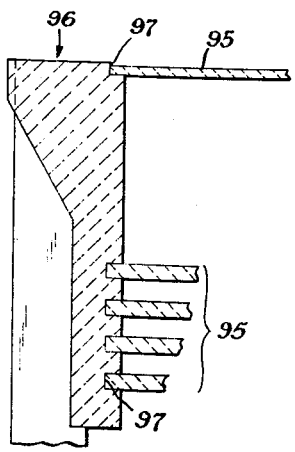
FIGURE 4 is an enlarged sectional elevation of a supporting block for horizontal baffles taken along line 4—4 of FIGURE 3.

Five octagonal graphite baffles 95 are positioned horizontally in the upper part of radiant heater 85 over heat chamber 86 by means of graphite blocks 96, one of which is shown in sectional elevation in FIGURE 4. Blocks 96 of which there are four are positioned between and supported by adjacent pairs of resistors 87 at the top thereof where neutral wires 158, 159, 160, and 161 of FIGURES 5 and 6 lead to ground wire 162. Since blocks 96 are in contact with only neutral wires, baffles 95 are not within the electrical circuit. Blocks 96 contain notches 97 cut vertically into which baffles 95 are seated. As shown in the drawing, the uppermost baffle 95 is positioned considerably above the other four baffles which are spaced about one-fourth inch from one another. The uppermost baffle serves both as a heat baffle and a transverse spacer for elements 87.

Resting on the uppermost graphite baffle 95 are four horizontal circulator dimpled molybdenum shields 98 about 0.010 inch thick. The shields are dimpled to hold them spaced apart. Each of baffles 95 and shields 98 contain a hole substantially centrally positioned therein and aligned with one another and with sight tube 58 to permit observation of the interior of heat chamber 86.

Molybdenum baffles 100 are shown placed just below heating elements 87 in a generally circular arrangement and sloped inwardly at their bottoms in a funnel-like manner to deflect heat from heat chamber 86 onto hearth 80. They are secured in place by slotted upright supports 101 positioned on cylindrical vertical sleeve 102 which rests on partial bottom 52 of chamber 50. The lower ends of baffles 100 define a central opening through which particulate metal passes from feed box 72 onto hearth 80.

Positioned exterior of radiant heater 85 (shown as an octagon in FIGURE 2 but, which, for the purposes of the invention, includes any polygonal or generally cylindrical shape) are vertical baffles 105 of graphite or high-melting metal, e.g., molybdenum or tantalum. They are arranged in five concentric circular rows, each row about ¼ to ½ inch apart radially. Baffles 105 are encircled by cylindrical shields 106 which comprise three concentric metal cylinders of stainless steel about 0.5 inch apart radially.

Cylindrical shields 106 rest on sloping partial bottom 52 of chamber 50. Baffles 105 are suspended from the upper part of shields 106 by means of hanger strips 108 the opposite ends of which are riveted to 106 and 105, respectively. Insulating spacers 99 are positioned about each nipple 88 and rest on the top of radiant heater 85. Horizontally positioned immediately above shields 106 and resting on insulating spacers 99 are dimpled circular stainless steel shields 109 just below cover 54; the dimples hold the shields in a spaced-apart relationship to one another.

Rotatable mold 82 containing retractable hearth 80 is set up into partial bottom 52 of chamber 50. The mold hangs from chamber 50 by means of supporting sleeve 112 provided with flange 114 at its lower edge through which pass elongated downwardly extending bolts 115 which engage ring 116 therebelow. Bolts 115 pass between the stationary generally horizontal connecting pipes 127a and 128a which form part of the cooling assembly for the mold and which are described in the paragraph immediately below. Bearing-block 117 rests directly upon ring 116. Race 118 is formed by bearing-block 117 and contains ball bearings 119 upon which rests the mold and hearth assembly. Mold 82 together with hearth 80 is rotatable on ball bearings 119 by means of sprocket 120 driven by chain 121 and sprocket wheel 122 turned by motor 123.

Mold 82 has channel 125 therein for circulating water therethrough. Manifolds 126 and 126a encircle the lower portion of mold 82. Manifold 126 is connected to header 127 by means of pipes 127a; manifold 126a is connected to header 128 by means of pipes 128a. Circumferential recesses 129 and 130 in the outer wall of mold 82 constitute two continuous grooves about the mold and thereby provide sliding engagement with headers 127 and 128, respectively. Cooling water is supplied to manifold 126a through feed line 131 and is drawn off through manifold 126 into drain line 132. O-rings 133 make tight seals on each side of grooves 129 and 130 and the surface of mold 82.

Hearth 80 is water-cooled and rotatable together with mold 82. Water passes from flexible feed line 135 through rotary joint 136 into annular channel 137 about retractable rod 138, thence outwardly along channel 137a, upwardly through annular channel 137b and thence inwardly along channel 139, down central channel 140 in rod 138, and out port 141 into flexible drain line 142. Hearth 80 is rotatably supported by sleeve 143 which is an integral part of hearth 80 and rests in sliding engagement on ring bearing 144. Ring bearing 144 rests on annular coil spring 145. Housing 146 incloses rotary joint 136, supporting sleeve 143 and the bearing assembly comprising 144 and 145, and is secured to retractable rod 138.

Figure 5:
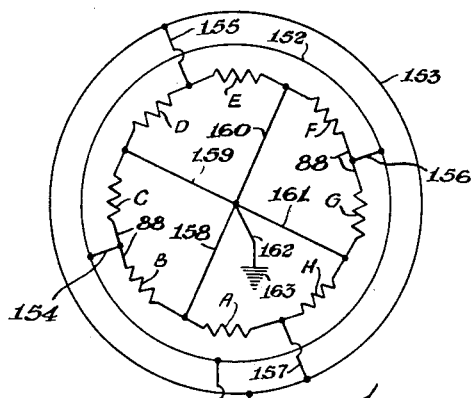
FIGURE 5 is a schematic wiring diagram of the internal circuitry employed to provide electrical energy to the radiant heater of FIGURE 3.
Figure 6:
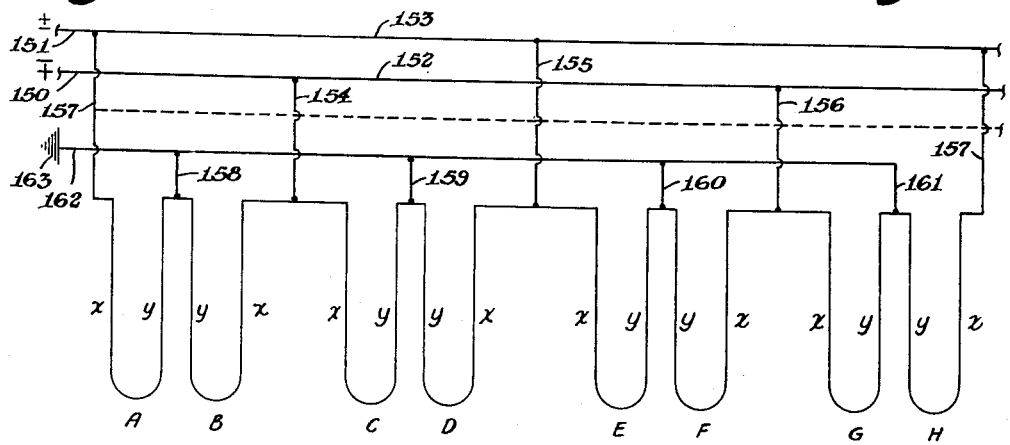
FIGURE 6 is a schematic illustration of the wiring of FIGURE 5 placed in a linear arrangement for greater clarity.

FIGURES 5 and 6 show schematically the circuitry which serves graphite resistors 93 of heating elements 87 comprising radiant heater 85. FIGURE 5 shows the circuitry substantially in the form used in the apparatus of FIGURE 2. The circuitry may be placed at any convenient place exterior of the apparatus but is usually placed on top of the apparatus more or less directly above the radiant heater. FIGURE 6 is a representation of the same circuitry in the interest of clarity as it would look if it were arranged in linear manner rather than circular; line 157 is shown at both ends of FIGURE 6 although it is a common electrical line. A broken line is used in FIGURE 6 to join the two lines 157 as shown to indicate that 157 is but a single line when the apparatus is assembled in the form used as shown in FIGURE 5. The eight resistors 93 are lettered A to H; the downward path of electric current through each resistor is designated $x$ and the upward path through each resistor is designated $y$ in FIGURES 3 and 6. Lead-in lines 150 and 151, carrying electrical current from and to a source of A.C. (not shown) are connected to distributing lines 152 and 153, respectively. Distributing line 152, in turn, is connected to crosslines 154 and 156 whereas distributing line 153 is connected to crosslines 155 and 157. For example (considering current as moving from negative to positive) when lead-in line 150 is negative, electric current passes from line 150 through line 152 to crosslines 154 and 156, crossline 154 thence carrying electricity to resistors A through D and crossline 156 carrying current to resistors E through H. The current leaves resistors C, D, E, and F by way of crossline 155 and leaves resistors G, H, A, and B by way of crossline 157 and thence from both crosslines 155 and 157 by way of line 153 to line 151 which is connected to a terminal of the source of A.C. Lines 158, 159, 160, and 161 lead from resistors A—B, C—D, E—F, and G—H, respectively, to main neutral line 162 which runs to ground 163.

Figure 2:
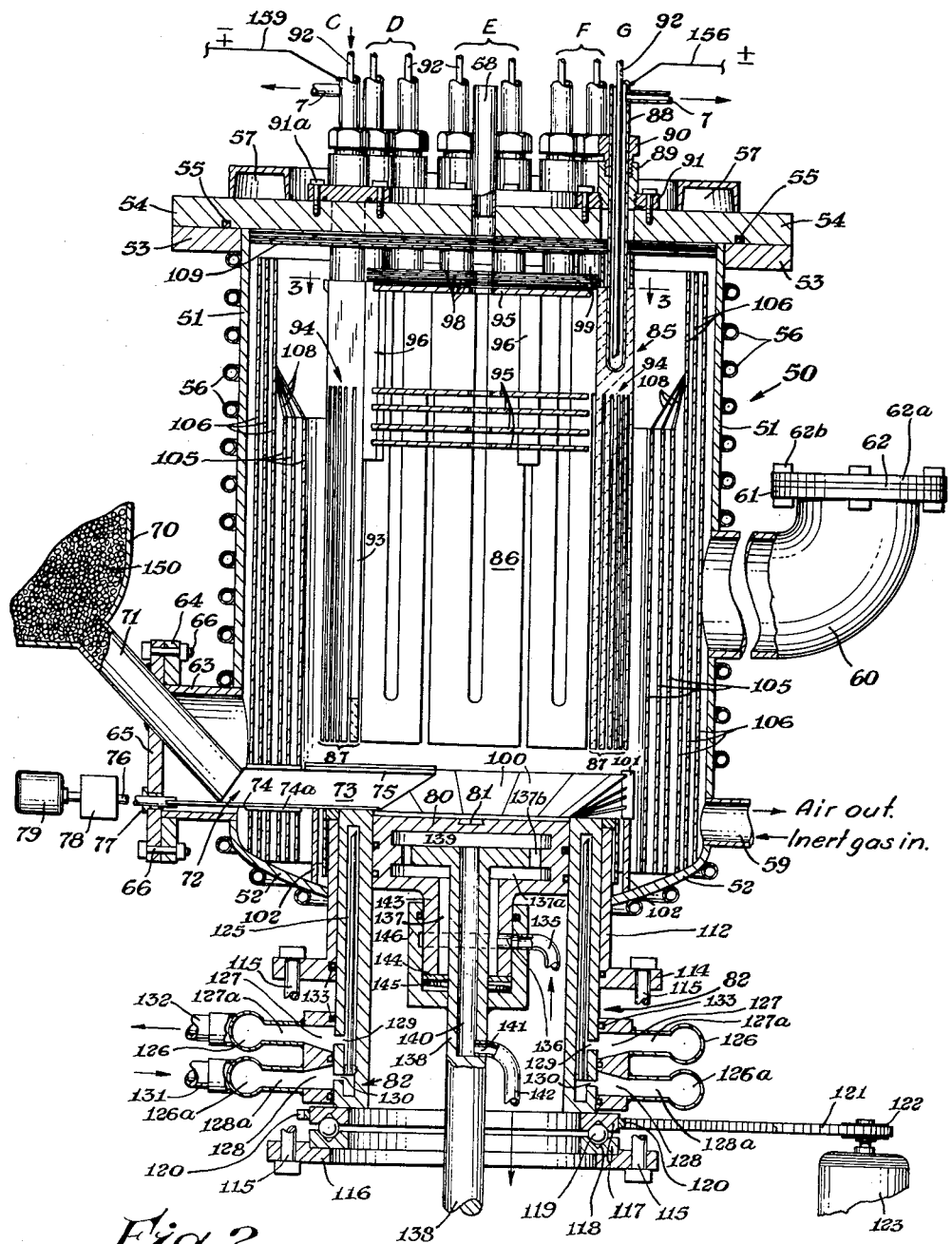
FIGURE 2 is an elevation, largely in section, of another embodiment of the apparatus of the invention.

The method of the invention will be described for the melting of titanium employing the embodiment of the invention shown by the apparatus of FIGURE 2 parts of which are further illustrated by FIGURES 3 to 8. Modifications of the method and apparatus described which would be apparent to those skilled in the art will be construed as falling within the purview of the invention.

In practicing the invention, a vacuum means is attached to duct 59 and the apparatus evacuated to at least about 1.0 mm. of mercury. Inert gas is then forced into the apparatus through duct 59, thereby backfilling the system with some inert gas.

Reservoir 70 is opened and titanium 150 preferably of a size that the particles do not have a greater dimension than about ⅜ inch, is placed in reservoir 70 and it is again closed. Some of the particulate titanium falls through chute 71 onto platform 74 of feed box 72. Water is started circulating through the cooling means which include: tubes 92 into nipples 88; coils 56 and 57 about and on the top of chamber 50, respectively; channel 125 in mold 82; and channel 139 and connecting channels 137 to 140 in hearth 80. A source of A.C. (supplying at least about 200 kw.) is connected to nipples 88 in heating elements 87 thereby causing electric current to flow through resistors 93 according to the electrical circuitry shown in FIGURES 5 and 6 and to produce radiant heat in chamber 86. The voltage and current employed are not critical; a voltage between 40 and 80 volts and a current between about 100 and 50,000 amperes are usually employed.

Hearth 80 is adjusted by means of rod 138 to between about ⅛ and ½ inch below the top edge of the walls of mold 82. Motor 123 is started which, by means of sprocket wheel 122, chain 121, and annular sprocket 120, rotates mold 82 and hearth 80. Motor 79 is started which, through a drive gear, cam, and crank assembly in housing 78 and reciprocating shaft 76, vibrates platform 74 of feed box 72 thereby shaking titanium or titanium alloy particles 150 onto hearth 80 at a controlled rate.

The interior of chamber 87 produces a black body effect when heat from resistors 93 radiate therein, and consequently heat is emitted therefrom onto hearth 80, converting titanium particles 150 to molten titanium, some of which fills recess 81 in hearth 80 and some of which flows outwardly to the walls of mold 82 where it slowly solidifies due to the cooling effect of water in channel 125. Over-hanging shield 74 prevents any melting of titanium at the outlet of feed box 72 or on platform 74. There is thus produced a body of molten titanium or titanium-base alloy gradually solidifying inwardly from the edge thereof to form a titanium or titanium-base alloy ingot on hearth 80.

As the level of the molten metal builds up, hearth 80 is retracted or lowered by rod 138 sufficiently to maintain a space of about ¼ inch between the top surface of the molten metal and the top edge of the walls of hearth 80. The solidified titanium metal thereafter actually serves as the hearth. More particulate titanium 150 is added as needed which may be continuous or intermittent.

The melting action on hearth 80 or on the top surface of the solidified titanium is substantially uniform and any shading effect of over-hanging shield 75 on the melting of metal thereon is minimized and the heat evenly distributed over the surface by the rotation of the hearth.

By continuing to feed particulate metal and retracting hearth 80, a continuous ingot of titanium or titanium-base alloy is produced having the cross-sectional shape and size of the interior of mold 82. As the ingot grows, hearth 80 may be completely withdrawn from the mold to permit the ingot to protrude below mold supporting ring 116. As desired, the ingot being produced may be cut into convenient lengths by known means.

Although the invention has been described for melting titanium or titanium-base alloys, any material may be melted which has a melting point below the melting point of the materials comprising the interior of the apparatus subjected to the radiant heat. Molybdenum baffles, which are commonly employed provide for heating up to about 2600° C. Tantalum, may be used in the apparatus in place of molybdenum which would permit the melting of a material having a melting point up to about 2900° C. Tungsten might be used in the apparatus for melting a material having a melting point up to about 3300° C.

Having described this invention, what is claimed and desired to be protected by Letters Patent is:

An apparatus for making an ingot of a particulate metal having a melting point up to 2600° C. which comprises a thermally insulated dark heating chamber, to produce the black body effect, formed by a plurality of substantially vertical electrical heating elements positioned in a generally polygonal pattern and having electrically neutral light-excluding reflective baffles positioned as follows: a plurality of substantially vertical radially spaced-apart baffles positioned concentric to and exterior of said vertical electrical heating members, spaced-apart substantially flat baffles positioned above the upper ends of said electrical heating elements, at least some of said flat baffles being of highly reflective high melting metal, a plurality of substantially rectangular highly reflective high melting metal baffles positioned below the lower ends of said electrical heating elements and arranged in overlapping inwardly declining relationship to form a funnel-shape having a hole in the central portion thereof for the downward and outward transmission of radiant heat therethrough; a substantially horizontal hearth slidably positioned within confining substantially vertical walls and in alignment with said opening and directly below said dark heating chamber to receive heat emitted thereby; a means for feeding the particulate metal pieces onto said hearth; a liquid-conducting cooling member positioned in contact with the exterior of said dark heating chamber and a liquid-conducting member positioned in contact with the confining walls for said hearth, and means for continuously retracting said hearth for removal of the ingot being formed.

References Cited in the file of this patent

UNITED STATES PATENTS

| | | |
|---|---|---|
| 2,152,528 | Biggert | Mar. 28, 1939 |
| 2,268,691 | Brooke | Jan. 6, 1942 |
| 2,351,490 | Cooper | June 13, 1944 |
| 2,408,514 | Hazelett | Oct. 1, 1946 |
| 2,476,916 | Rose et al. | July 19, 1949 |
| 2,541,764 | Herres et al. | Feb. 13, 1951 |
| 2,640,861 | Kremers | June 2, 1953 |
| 2,650,254 | Kremers | Aug. 24, 1953 |
| 2,650,944 | Ipsen | Sept. 1, 1953 |
| 2,709,842 | Findlay | June 7, 1955 |
| 2,727,937 | Boyer | Dec. 20, 1955 |
| 2,734,244 | Herres | Feb. 14, 1956 |
| 2,744,946 | Lewicki | May 8, 1956 |
| 2,745,891 | Darby et al. | May 15, 1956 |
| 2,784,243 | McAllister et al. | Mar. 5, 1957 |
| 2,789,150 | Clough et al. | Apr. 16, 1957 |
| 2,858,586 | Brennan | Nov. 4, 1958 |
| 2,958,913 | Schaefer | Nov. 8, 1960 |